INVENTOR.
PAUL W. SOKOLOFF
BY *John F. Lawler*
ATTORNEY

United States Patent Office 3,471,845
Patented Oct. 7, 1969

3,471,845
SECURITY SYSTEM
Paul W. Sokoloff, Los Altos, Calif., assignor to Sylvania Electric Products Inc., a corporation of Delaware
Filed May 27, 1966, Ser. No. 553,464
Int. Cl. G08b 13/00
U.S. Cl. 340—258                                    1 Claim

ABSTRACT OF THE DISCLOSURE

An intrusion detection system comprising an amplifier having antennas connected to the input and output, respectively, is adjusted to oscillate at a frequency for which the net gain of the amplifier, antennas and free space path between the antennas is unity and the total phase delay is an integral multiple $2\pi$ radians. An intruder in the field between the antennas alters the phase delay and produces a change in frequency of oscillation. The frequency change is monitored by signal processing and alarm circuitry.

---

Figure 1:
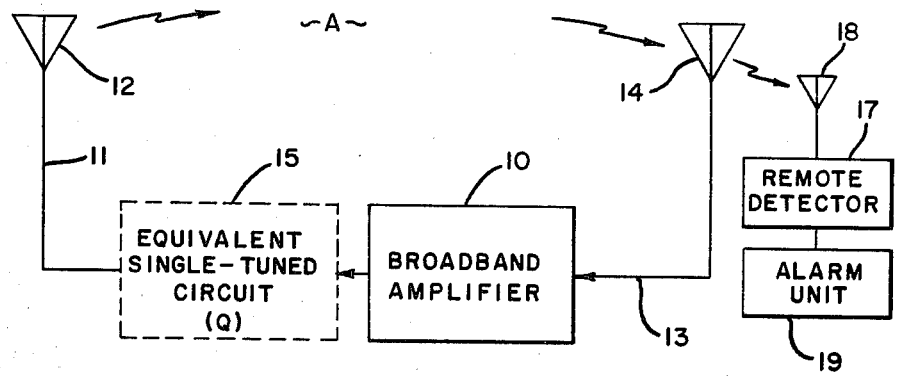

This invention relates to intrusion detection systems, and more particularly to an improved electromagnetic wave system for detecting motion as well as presence of objects within a protected area.

Electromagnetic wave intrusion detection systems for indoor and outdoor volumetric and perimeter protection generally propagate such waves through the area under surveillance and sense an intrusion by detecting changes in the waves caused by an object entering the area. Such systems comprise a source of electromagnetic waves, such as a radio frequency (RF) oscillator, an antenna for transmitting the waves through the area, and a receiving antenna connected to a receiver for monitoring the received waves. The output of the receiver controls the alarm or no-alarm state of the system depending on the detection or lack of detection of a change in the received waves. Such a change, by way of example, may be a Doppler frequency shift caused by movement of an object in the protected area.

These systems inherently require stable transmitting oscillators in order to provide an effective reference or standard from which changes caused by the object or intruder can be measured. Similarly, the signal processing circuits in the receiver must remain precisely stable for extensive surveillance periods in order to continuously monitor the received waves for the changes characteristically caused by an intruder. Such constraints on system performance desirably reduces false alarms but also increases the cost and complexity of the equipment and its maintenance.

An object of this invention is the provision of a low-cost, reliable electromagnetic wave intrusion detection system.

A further object is the provision of such a system with relatively simple signal generating and processing circuits which may be easily installed and maintained.

Areas protected by one or more electromagnetic wave intrusion detection systems may be and generally are monitored at a remote manned control center. Communication between the center and protected sites requires a direct line connection with attendant disadvantages of installation difficulties and expense as well as vulnerability to security compromise. Alternatively, the output of the receiver at the protected site may be transmitted by an RF link to the control center but this involves additional equipment at both ends.

Another object of the invention is the provision of an intrusion detection system which is self-telemetering, that is, intrusion sensings at the protected site are relayed to the control center without a direct line connection or an additional RF link.

Another object is the provision of an intrusion detection system which permits location of signal processing receiver circuits in a protected environment at the control center remote from the site, thus reducing the otherwise difficult and costly "all-weather" conditions on circuit and equipment design.

These objects are accomplished with an intrusion detection system featuring a radio frequency (RF) oscillator which is comprised of an untuned or broadly tuned RF amplifier and feedback loop which includes the area to be protected, and a remote frequency monitor which gives an alarm when the oscillator frequency changes due to an intruder. The input and output of an RF amplifier are connected to spaced antennas which are at opposite ends of or within the protected area so that the frequency of oscillation of this circuit depends upon the phase delay caused by transmission of radio waves across that area. In other words, the air path across the area is a transmission line having an effective electrical length. This length changes when an object or an intruder enters the area, thus producing a phase change in the oscillator loop which is corrected by a change in the frequency of the oscillator. Since the protected area is itself part of the oscillator circuit, radio waves generated by the oscillator are radiated continuously in a self-telemetering manner for detection and processing by alarm apparatus at a site remote from the protected area.

Figure 5:
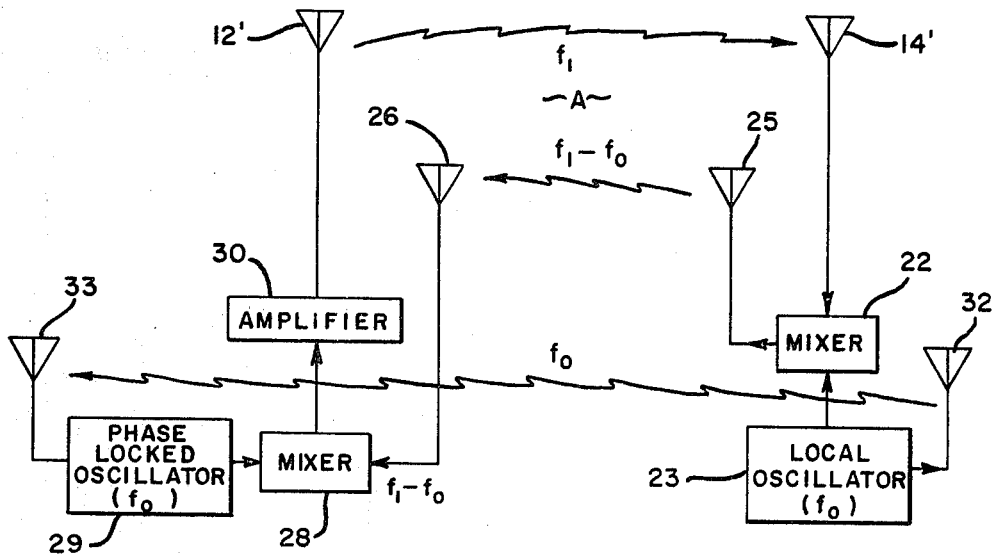
Figure 6:
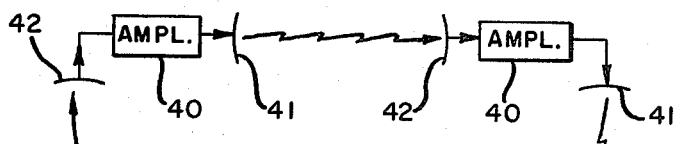
Figure 6:
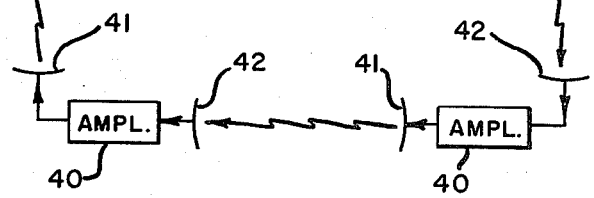
Figure 2:
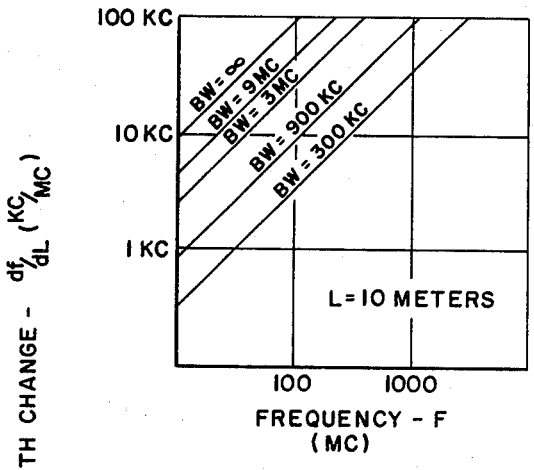
Figure 3:
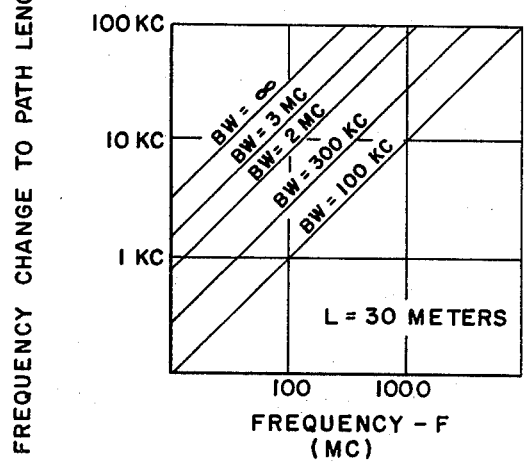
Figure 4:
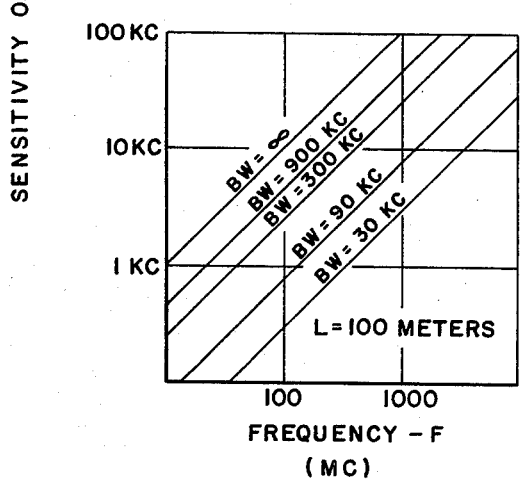

These and other objects of the invention will become apparent from the following description of a preferred embodiment thereof, reference being had to the accompanying drawings in which:

FIGURE 1 is a simplified block diagram of an intrusion detection system embodying this invention;

FIGURES 2, 3, and 4 are curves illustrating the frequency response of this detection system for different spacings of the oscillator antennas;

FIGURE 5 is a block diagram of a modified form of the invention featuring a radio link instead of a direct connection between the oscillator antennas; and FIGURE 6 is a block diagram of a perimeter-type intrusion detection system embodying the invention.

Referring now to the drawings, FIGURE 1 shows a simplified embodiment of the invention comprising a broadband amplifier 10 having an output terminal connected by line 11 to transmitting antenna 12 and an input terminal connected by line 13 to receiving antenna 14. The antennas 12 and 14 are substantially spaced apart and include between them an area A to be protected. The amplifier 10, by way of example, may comprise a very broadband vacuum tube or transistor video amplifier (either single stage or chain), a broadly tuned RF amplifier stage, a tunnel diode amplifier, or a klystron. These types are not exclusive of others. A suitable power supply, not shown, energizes the amplifier in the well-known manner.

In accordance with the invention, the composite of the amplifier 10, lines 11 and 13, antennas 12 and 14, and the protected area A constitute an RF oscillator circuit. This circuit oscillates at a frequency for which the net gain around the loop from output to input of the amplifier is unity and for which the total RF phase shift is some multiple of 360°. This is electrically equivalent to connecting the amplifier to a single-tuned circuit as suggested at 15 in broken line in FIGURE 1. The phase delay of the RF wave transmitted from antenna 12 to antenna 14 is dependent upon the radio frequency absorption and reflection characteristics within the protected area A. If an intruder enters area A, the phase delay of the propagated wave is changed, thereby changing the frequency of oscillation of the entire circuit.

Utilization means may comprise a remote detector 17 having an antenna 18 which monitors the frequency of oscillation of the circuit and energizes a signal or alarm unit 19 in response to a change in frequency occasioned by the presence of an intruder in area A. Detector 17 comprises a frequency discriminator such as a standard frequency modulation (FM) receiver with a direct coupled output from the discriminator, or an FM receiver with automatic frequency control (AFC) in which the AFC voltage is monitored, or a digital frequency counter. In general, any frequency-sensitive device of sufficient inherent stability, voltage sensitivity, and frequency deviation sensitivity for the particular installation may be employed.

The phase delay of an RF wave over a free-space air path is $$\theta_{air} = \frac{2\pi f L_{air}}{c} \quad (1)$$

and the phase delay over a transmission line is $$\theta' = \frac{2\pi f L'}{v} \quad (2)$$

where $c$ and $v$ are the velocities of propagation and $L_{air}$ and $L'$ are the physical lengths of the air path and the transmission lines, respectively; $c$ and $v$ are essentially constant.

In practice, the air path coupling is not that of free space, but is the composite, or vector sum of direct coupling between antennas and couplings due to reflections from various objects and bodies in the vicinity of the antennas. These, at any one frequency, may be resolved into a single equivalent air path distance. A change in the position of an object relative to the antennas alters the equivalent separation of the antennas, and thus changes the phase delay of the wave by a corresponding degree.

In the absence of any frequency-sensitive components, the system described in FIGURE 1 oscillates at a frequency for which.

$$\theta = \frac{2\pi f L}{c} = 2\pi n \quad (3)$$

where L is the equivalent free-space length of the loop and is equal to $$L = L_{air} + L' \frac{c}{v} \quad (4)$$

It is seen from the above that $$f = nc/L \quad (5)$$

and $$L = nc/f \quad (6)$$

Frequency-sensitive elements, if employed, may be represented in an analysis as a single-tuned circuit having the same phase delay, $\phi$, and the same rate of change of phase delay versus frequency. Since primary interest is in $d\phi/df$, an assumption may be made that there exists a single-tuned circuit which is resonant and has zero phase delay at the operating frequency F for the condition of no intrusion. This circuit has a value of Q which gives it a rate of change of phase delay $(d\phi/df)$ equivalent to that of the frequency-sensitive delay elements of the system. In a single-tuned circuit at resonance, the delay angle derivative is $$\frac{d\phi}{df} = +\frac{2Q}{F} \quad (7)$$

$$Q = +\frac{F}{2}\frac{d\phi}{df} \quad (8)$$

For a frequency displaced by an increment $f$ from resonant frequency F, $$\phi = +2Q\frac{f}{F} \text{ radians} \quad (9)$$

The resonant frequency of a system with frequency-sensitive time delay is therefore determined by $$\theta + \phi = 2\pi n = \frac{2\pi(F+f)L}{c} + 2Q\frac{f}{F} \quad (10)$$

Clearing and reducing, $$f = \frac{\pi F(nc - FL)}{\pi FL + Qc} \quad (11)$$

Differentiating to find the sensitivity of frequency change to path length change, $$\frac{df}{dL} = \frac{(\pi FL + Qc)(-\pi F^2) - \pi^2 F^2(nc - FL)}{(\pi FL + Qc)^2} =$$

$$-\frac{\pi F^2 c(Q + \pi n)}{(\pi FL + Qc)^2} \quad (12)$$

Substituting $nc/F$ for L, the result is $$\frac{df}{dL} = -\frac{\pi F^2 c(Q + \pi n)}{c^2(Q + \pi n)^2}$$

$$\frac{df}{dL} = -\frac{F^2}{c}\frac{\pi}{Q + \pi n} \quad (13)$$

The choice made so far that $n$ is an integer number is based on the assumption that there is no phase reversal in the amplifier and that the antennas are so aligned as to provide no phase reversal due to orientation. The first assumption is obvious. Not so obvious is the fact that the phase of a signal in a dipole receiving antenna may be reversed by 180 degrees by spinning it around 180 degrees. For either of these conditions, the value of the equivalent air path assumes value of $n=0.5, 1.5, 2.5, 3.5$, etc. When both conditions apply simultaneously, $n$ again has integer values.

FIGURES 2, 3, and 4 are plots of $df/dL$ as a function of frequency and equivalent bandwidth $(BW=F/Q)$ for thre values of equivalent air path around the loop.

It will be seen from this description that an intrusion detection system utilizing extremely simple, noncritical electromagnetic wave radiation circuitry is provided. The problem of RF generator stability is substantially reduced or eliminated as compared with oscillators in conventional bistatic radar-type systems because the monitored environment itself functions both as a frequency-determining circuit and as an intrusion sensor. The system also is self-telemetering and thus requires no additional wire line or radio link to the location of the frequency monitor and alarm unit. It will also be noted that the system provides "presence" detection as well as detection of motion.

A modified form of the invention is shown in FIGURE 5 wherein the direct cable connection between the antennas 12' and 14' within the protected area is eliminated. Antenna 14' is connected to a mixer 22 to which a local oscillator 23 having a frequency $f_0$ is also connected. The output of the mixer is directly connected to antenna 25 which radiates the energy across the protected area to antenna 26 connected directly to a mixer 28. A local oscillator 29 having a frequency $f_0$ identical to that of oscillator 23 provides a second input to mixer 28, and the output of the latter is fed to the input terminal of amplifier 30. Antenna 12' is directly connected to the output of amplifier 30. Thus, while the antennas are electrically coupled to the input and output terminals of the amplifier, one of such couplings is effected by an RF link.

In order that local oscillators 23 and 29 shall have the identical frequency outputs necessary to sustain oscillation, they are phase-locked together. To accomplish this, antenna 32 is connected to oscillator 29. The output ($f_0$) of oscillator 23 radiated by antenna 32 is received by antenna 33 and is used, employing well-known techniques, to correct the frequency of oscillator 29. Thus, the phase of oscillator 29 is synchronized with that of oscillator 23.

In operation, antenna 12' radiates an RF wave of frequency $f_1$ which is received by antenna 14' and is mixed in mixer 22 with the output $f_0$ from oscillator 23 to produce a difference signal $f_1-f_0$. The latter signal is directed by antenna 25 across the area A to antenna 26 and appears as an input to mixer 28 within which it is beat with the output $f_0$ of oscillator 29 to produce an output signal $f_1$. This signal is amplified and radiated by antenna 12' to complete the oscillator loop. The remote detector and alarm unit, not shown, operate as described above to monitor changes in frequency $f_1$.

It will be noted that radio waves having three different frequencies are transmitted across area A and a change in the phase of any of these waves results in a change of the frequency $f_1$. Thus, in addition to the elimination of the direct wire link between antennas, this system has the additional advantage of augmenting coverage of the protected area with three frequency-distinct waves and thus reducing the probability of insensitive pockets in that area.

The invention may also readily be practiced with a system providing perimeter protection as shown in FIGURE 6. Amplifiers 40 located at the corners of a polygonal area S are serially electromagnetically coupled together by directional transmitting antennas 41 and directional receiving antennas 42 to complete a full feedback loop around the perimeter of the area. The input and output of each amplifier are connected to receiving and transmitting antennas, respectively, and each transmitting antenna is directed toward the receiving antenna of one of the adjacent amplifiers. Thus, the system is simply a series of RF repeaters feeding back on themselves in a closed loop and the analysis of operation is similar to that derived above. If the amplifier gain is sufficiently high, an amplifier may not be required at each corner. The remote detector and alarm unit, not shown, operates in the manner described above to sense frequency changes caused by entry of an intruder between opposed antennas.

From the above description, it will be seen that the security system embodying the invention includes the protected environment as part of the "transmitter" circuit and the radiated signal is altered by a change in the environment. Thus, this single circuit combines some or all of the functions of the transmitter, receiver, and sensor of a conventional system. The air path across the protected area is a parameter of the oscillator circuit and is utilized to control the carrier frequency of the oscillator.

Changes, modifications, or improvement in the above-described embodiments of the invention may occur to those skilled in the art without departing from the precepts of the invention. For example, the frequency monitoring circuit may be directly electrically connected to the oscillator circuit and located at the protected site. Also, the system may be used for any purpose in which automatic detection of presence or movement of an object in a predetermined area is desired, such as in traffic counters, inventory control, and the like. It is also within the province of this invention that oscillatory energy other than electromagnetic waves, such as sonic and supersonic waves, may be utilized in applications and under conditions compatible with such energy medium. The novel features of the system are described in the appended claim.

I claim:
1. A system for detecting the presence of an object in an area comprising
   a radio frequency amplifier having input and output terminals,
   a first antenna coupled to the input terminal of the amplifier,
   a second antenna coupled to the output terminal of the amplifier,
   one of said antenna couplings being a first radio frequency link,
   a pair of local oscillators having identical output frequencies,
   said local oscillators being coupled by a second radio frequency link whereby said oscillators are phase locked together,
   a pair of mixers having inputs connected respectively to the outputs of said local oscillators,
   the output of one of said mixers being coupled by said first radio frequency link to a second input of the other mixer,
   means for connecting one of said antennas to a second input of said one of said mixers,
   means for connecting the output of said other mixer to said input terminal of the amplifier,
   said antennas being physically oriented relative to each other and to said area so that at least part of the area constitutes a portion of an energy feedback path between the amplifier terminals whereby to oscillate and radiate radio frequency waves, and
   utilization apparatus responsive to the change in said waves produced by the object in the area.

References Cited

UNITED STATES PATENTS

| 2,083,344 | 6/1937 | Newhouse et al. | 343—7.5 X |
| 2,530,141 | 11/1950 | Atkins | 343—7.5 |
| 2,655,645 | 10/1953 | Bagno | 340—258 X |
| 2,400,309 | 5/1946 | Kock. | |

JOHN W. CALDWELL, Primary Examiner

D. L. TRAFTON, Assistant Examiner

U.S. Cl. X.R.

343—5